US011926002B1

(12) United States Patent
Han et al.

(10) Patent No.: US 11,926,002 B1
(45) Date of Patent: Mar. 12, 2024

(54) CMT AUTOMATIC OVERLAYING METHOD FOR OPENING IN SIDE WALL OF BIMETALLIC COMPOSITE PIPE

(71) Applicant: Tianjin University, Tianjin (CN)

(72) Inventors: Yongdian Han, Tianjin (CN); Zhaowei Xue, Tianjin (CN); Lianyong Xu, Tianjin (CN); Lei Zhao, Tianjin (CN); Kangda Hao, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 18/475,219

(22) Filed: Sep. 27, 2023

(30) Foreign Application Priority Data

Nov. 11, 2022 (CN) .......................... 202211409484.6

(51) Int. Cl.
*B23K 9/095* (2006.01)
*B23K 9/013* (2006.01)
*B23K 9/16* (2006.01)
*B23K 101/10* (2006.01)

(52) U.S. Cl.
CPC .............. *B23K 9/095* (2013.01); *B23K 9/013* (2013.01); *B23K 9/16* (2013.01); *B23K 2101/10* (2018.08)

(58) Field of Classification Search
CPC ........ B23K 9/0052; B23K 9/173; B23K 9/16; B23K 9/013; B23K 9/095; B23K 2101/10
See application file for complete search history.

(56) References Cited

U.S. PATENT DOCUMENTS

2017/0217061 A1* 8/2017 Roche .................... B29C 66/742
2020/0147726 A1* 5/2020 Yang .................. B23K 15/0086

FOREIGN PATENT DOCUMENTS

| CN | 107378201 | 11/2017 |
| CN | 110216360 | 9/2019 |
| CN | 111230869 | 6/2020 |
| CN | 113560700 | 10/2021 |
| CN | 113579418 | 11/2021 |

* cited by examiner

*Primary Examiner* — Brian W Jennison
(74) *Attorney, Agent, or Firm* — JCIPRNET

(57) ABSTRACT

The invention belongs to the field of welding technology and discloses a CMT automatic overlaying method for opening in side wall of bimetallic composite pipes. The method includes: establishing a mathematical model of the opening in a side wall to be welded; Based on the mathematical model, determining the trajectory of the saddle line during overlaying; dividing the trajectory of the saddle line into several welding runs, all of which adopt the downslope welding process; establishing a three-dimensional model of the opening in the side wall to be welded and a CMT overlaying system simulation model; Based on the simulation model, planning the overlaying path of the CMT overlaying, and generating an overlaying offline instruction; Based on the offline instruction, performing CMT overlaying on the opening in the side wall to be welded according to the overlaying sequence, so as to obtain a weld overlay.

17 Claims, 7 Drawing Sheets

CMT AUTOMATIC OVERLAYING METHOD FOR OPENING IN SIDE WALL OF BIMETALLIC COMPOSITE PIPE

CROSS-REFERENCE TO RELATED APPLICATION

This application claims the priority benefit of China application no. 202211409484.6, filed on Nov. 11, 2022. The entirety of each of the above-mentioned patent applications are hereby incorporated by reference herein and made a part of this specification.

BACKGROUND

Technical Field

The disclosure belongs to the field of welding technology, and more specifically relates to a CMT automatic overlaying method for openings in the side wall of a bimetallic composite pipe.

Description of Related Art

Nowadays, nickel-based composite pipeline materials have been gradually popularized and applied in oil and gas process pipelines, and the nickel-based composite pipe lined with Incone1625+base pipe X65 is one of them. In the development process of oil and gas resources, the process pipeline will set high-point venting and low-point discharge according to actual requirement, and basically the pipe base is adopted to set the branch. When the nickel-based lined pipeline serves as the main pipeline, during the prefabrication process of nickel-based alloy composite pipes, it is inevitable to arrange pipe sockets to connect branch pipes.

When the main pipe and the pipe base are arranged with a riding T-shaped joint, the carbon steel base material will be exposed at the opening section of the main pipe, forming a fragile point and causing quality and safety issues. In order to ensure that the nickel-based alloy composite layer pipe still maintains good hardness, toughness, corrosion resistance, friction resistance and other properties at the opening position, it is necessary to supplement the nickel-based composite layer on the surface of the opening section to prevent the carbon steel material outside the composite layer coverage area from directly contacting the pipeline medium.

Since the cross-sectional shape of the side wall of the base pipe is saddle-shaped and belongs to a complex curve, manual arc welding is generally adopted for overlaying at present. As the demand for subsea oil and gas pipelines increases and the requirements for welding quality and efficiency become higher, conventional manual welding has gradually been unable to meet production requirements. Therefore, robot welding has become the best solution, which allows welders to be free from tedious work. In the meantime, the reliability of welding production and product stability will no longer rely on the skills and experience of the welder. When the needs arise, it is necessary to adopt appropriate welding task planning methods and take into comprehensive consideration of the posture, motion trajectory and process parameters of the welding robot welding gun to plan the welding task.

As a new technology, cold metal transfer (CMT) welding has been widely used in the field of overlaying due to its advantages of small heat input, low dilution rate, and no spatter. Patent publication number CN201910394287.3 discloses a nickel-based alloy overlaying process for alloy tanks. The CMT overlaying process is adopted to carry out nickel-based alloy overlaying, which reduces the dilution rate of the overlaying surface. Patent publication number CN202110908692.X provides a CMT method for manufacturing the corrosion-resistant nickel-based alloy weld overlay, and the obtained weld overlay has excellent intergranular corrosion resistance. Both of them use CMT+oscillating overlaying method to obtain a well-formed weld overlay on the flat plate.

The technologies and processes disclosed above are all overlaying on a flat plate, and the trajectory and welding process of the robot are not complicated. Patent publication number CN202110961947.9 discloses a method, a processor and a medium for manufacturing a nickel-based alloy coating. A layer of nickel-based alloy is overlayed on the inner wall of the P110 casing using the CMT+P process combined with a rotating worktable. However, when the rotary table works, it is also a simple circular motion. At present, there is no CMT overlaying technology for the complex intersecting curve of the pipe formed after the side wall of the composite pipe is opened.

SUMMARY

In view of the shortcomings of the existing technology, the purpose of the present disclosure is to provide a method for CMT overlaying of the complex intersecting curves formed by opening holes in the side walls of composite pipes, so as to solve the problem of low-efficiency overlaying using manual arc welding for existing oil and gas process pipelines with complicated intersecting curves.

In order to achieve the above object, the present disclosure provides a CMT automatic overlaying method for opening holes in the side wall of a bimetallic composite pipe, the method includes:
- S1. Establishing a mathematical model of the opening in the side wall of the composite pipe to be welded, and keeping the axis of the opening in the side wall of the composite pipe parallel to the horizontal plane;
- S2. Based on the mathematical model, illustrating the projection pattern of the opening in the side wall of the composite pipe, and determining the trajectory of the saddle line during overlaying based on the projection pattern;
- S3. Dividing the trajectory of the saddle line into several welding runs, all of which adopt the downslope welding process, and planning the overlaying sequence of the welding runs;
- S4. Establishing a three-dimensional model of the opening in the side wall of the composite pipe to be welded and a CMT overlaying system simulation model;
- S5. Based on the overlaying sequence, planning the overlaying path of the CMT overlaying system simulation model to the three-dimensional model, and generating an overlaying offline instruction based on the overlaying path;
- S6. Based on the offline instruction, performing CMT overlaying on the opening in the side wall of the composite pipe to be welded according to the overlaying sequence, so as to obtain a weld overlay.

Further, the expression of the mathematical model is the parameter equation of the saddle line weld at any point in the wall thickness direction of the opening in the side wall of the composite pipe:

$$\begin{cases} x = \sqrt{R_t^2 - r^2\sin^2 t} - R_1 \\ y = r\sin t \\ z = r - r\cos t \end{cases}$$

In the formula, r is the radius of the opening in the side wall, $R_1$ is the inner wall radius of the composite pipe, $R_t$ is the radius at any point in the wall thickness direction, and $R_t \in (R_1, R_2)$, $R_2$ is the outer wall radius of the composite pipe, $t \in [0, 2\pi]$.

Further, in step S2, the degree of curvature of the saddle line on the inner wall of the composite pipe and the saddle line on the outer wall of the composite pipe are compared based on the projection pattern.

If the difference between the degree of curvature $L_1$ of the saddle line on the opening in the inner wall of the composite pipe to be welded and the degree of curvature $L_2$ of the saddle line on the opening in the outer wall is less than the preset value, the trajectory of the saddle line on the opening in the outer wall of the composite pipe is used as the trajectories of all saddle lines on the openings in the side wall of the composite pipe during overlaying.

If the difference between the degree of curvature $L_1$ of the saddle line on the opening in the inner wall of the composite pipe and the degree of curvature $L_2$ of the saddle line on the opening in the outer wall of the composite pipe is not less than the preset value, then the trajectory of the saddle line at the middle position of the opening in the side wall of the composite pipe is replaced with the trajectory of the saddle line on the opening in the outer wall of the composite pipe during overlaying.

Preferably, the preset value is 1 mm to 2 mm.

Further, in step S3, the overlaying sequence includes: dividing the trajectory of saddle line on the opening into an upper half and a lower half with its horizontal midline as a boundary, and the lower half of the welding runs is below the horizontal center line. When welding, all the welding runs on the lower half are welded sequentially by downslope welding, then the opening in the side wall of the composite pipe is turned 180° around the axis, and then all the welding runs on the lower half are welded sequentially by downslope welding until all the welding runs are welded. Preferably, there are 4 sections of welding runs; more preferably, the lengths of the 4 sections of welding runs are the same.

Further, in step S3, each welding run is divided into at least 4 segments, and each segment of the welding runs is set to have a different welding speed; preferably, the welding speed is between 45 cm/min and 55 cm/min.

Furthermore, the lengths of various segments of welding runs are the same or different.

Further, in step S5, the step of planning the overlaying path of the simulation model and generating an overlaying offline instruction based on the overlaying path includes:

S501. Establishing a three-dimensional model of the opening in the side wall of the composite pipe to be welded and a CMT overlaying system model;

S502. Obtaining the pipe intersecting characteristic curve after the side wall of the composite pipe is opened based on the three-dimensional model;

S503. Extracting the downslope welding path trajectory characteristics of each section of welding runs from the characteristic curve, and setting the welding gun posture information corresponding to each section of welding runs in the CMT overlaying system model based on the path trajectory characteristics;

S504. Generating the offline instruction based on the welding gun posture information.

Furthermore, the welding gun posture information includes the welding gun camber angle, the welding gun forward tilt angle, the robot joint configuration information, and the position and speed of the trajectory approach point and exit point. Preferably, the camber angle is within the range of 0° to 45°; more preferably, the forward tilt angle is within the range of 5° to 10°.

Further, in step S6, the process parameters of the CMT overlaying include: the wire feeding speed is within 6.0 m/min to 8.0 m/min, the current is 159 A to 205 A, the voltage is 11.9 to 15.2V, the dry elongation of the welding wire is 12 mm to 15 mm, and the gas flow rate is 25 L/min to 30 L/min; preferably, the protective gas in the CMT overlaying process is pure argon; more preferably, before performing CMT overlaying according to the overlaying sequence, the exposed surface of the opening on the side wall of the composite pipe to be welded is cleaned and polished first.

Further, the CMT overlaying is single-run welding; preferably, when overlaying, according to the depth of the opening in the side wall of the composite pipe to be welded, multi-run CMT overlaying is carried out from the inner wall of the composite pipe to the outer wall thereof until all side walls with the opening to be welded are all welded; more preferably, when performing CMT overlaying, the spacing between adjacent welding runs is 3 mm to 4 mm.

Compared with the related art, the above technical solution conceived by the present disclosure mainly has the following advantages:

The overlaying on the opening in the side wall of the composite pipe is different from that of a flat plate. The spatial position and shape thereof are complex, and high requirements are imposed on the robot trajectory and the posture of the welding gun. The present disclosure realizes the automatic overlaying through the robot through the offline programming method, and realizes automatic overlaying of complex curves. Compared with manual arc welding, the forming quality is more stable and less susceptible to interference from external factors. Not only does it get rid of the cumbersome manual robot teaching and improve the efficiency of overlaying, but the trajectory accuracy of robot overlaying obtained is much higher than that of manual teaching, further improving the overlaying efficiency and trajectory accuracy.

By pre-establishing a mathematical model of the opening in the side wall of the composite pipe to be welded, the present disclosure intuitively and clearly expresses the cross-sectional shape in all directions after opening the side wall of the composite pipe, and drawing software is used to draw the cross-section of the opened side wall of the composite pipe perpendicular to the aperture based on the mathematical model. Moreover, the trajectory of saddle line during overlaying is determined accurately based on the comparison between the curvature of the trajectory of saddle line on the inner wall of the opening and the outer wall of the opening.

The present disclosure further divides a circle of saddle line trajectory into multiple sections of welding runs, and designs the overlaying sequence for the welding runs using the downslope welding process. During the downslope welding process, the molten pool is less and less affected by gravity, that is, the driving force of the downward flow is getting smaller and smaller, which solves the problem of poor formation of the weld overlay due to the constant change of the gravity component during the downslope welding process, and the obtained weld overlay is not only excellent in shape but also stable in quality.

The present disclosure also establishes a CMT overlaying system simulation model, accurately plans the overlaying path in the simulation model based on the pre-planned overlaying sequence, and then generates the overlaying offline instruction for the designed overlaying path, and applies the above process to perform CMT overlaying on the opening in the side wall of the composite pipe to be welded to achieve the effect of automatically obtaining the overlaying layer.

The present disclosure further divides each section of welding runs into at least 4 welding runs, and the overlaying speeds of various segments of welding runs are different. The more divided sections, the more stable the overlaying forming will be.

The standard for comparing the curvature of trajectories of the saddle line of the inner wall of the opening and the outer wall of the opening in the present disclosure is to determine whether the difference in curvature between the outer wall of the composite pipe and its inner wall saddle line is less than a preset value. In the present disclosure, the preset value is designed to be within 1 mm to 2 mm. When the difference is less than the above value, the degrees of curvatures of the two saddle lines are considered to be close, otherwise they are not close. If the degrees of curvatures are close, the trajectory of the saddle line on the outer wall during overlaying may be used to replace all the trajectories of saddle lines in the wall thickness direction. If the degrees of curvatures are not close, it is necessary to replace the trajectory of saddle line of the outer wall with the trajectory of the saddle line of the inner wall at the middle position in the wall thickness direction, so as to realize the standardization of the trajectory of the saddle line to be welded.

When the present disclosure carries out actual CMT overlaying for the opening of the side wall of the composite pipe to be welded, a single-run overlaying process is adopted, aiming at the wall thickness of the composite pipe, multiple overlayings are carried out from the inner wall of the composite pipe to the outer wall to form multiple multi-run welds composed of a single weld run, and the distance between adjacent welding runs is controlled between 3 mm and 4 mm. The specific number of paths is determined by the depth of the opening (that is, the wall thickness at the opening of the composite pipe).

The present disclosure adopts CMT overlaying, and is able to avoid the generation of short circuit and large current in the droplet transfer process by drawing back the welding wire, greatly reduces heat input, and inhibits the diffusion of Fe elements in the X65 base material to the weld overlay. Moreover, the pitting corrosion and intergranular corrosion test results are far lower than the acceptance standard value, proving that the quality of the weld overlay formed by the present disclosure is improved.

DESCRIPTION OF THE EMBODIMENTS

In order to make the object, technical solution and advantages of the present disclosure clearer, the present disclosure will be further described in detail below in conjunction with the accompanying drawings and embodiments. It should be understood that the specific embodiments described here are only used to explain the present disclosure, not to limit the present disclosure.

Embodiment 1

Figure 1:
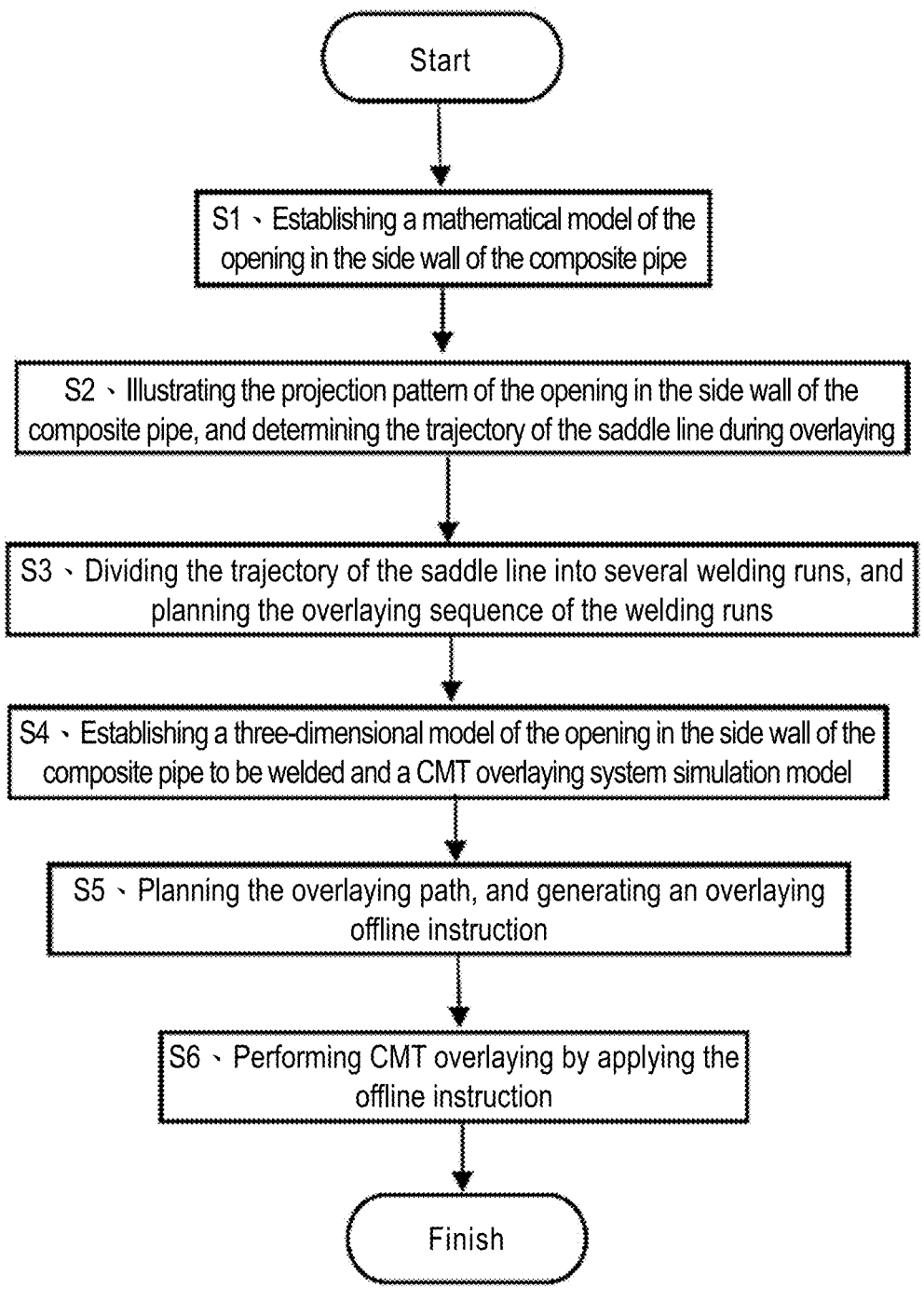
FIG. 1 is a flowchart of CMT overlaying technology for openings in the side wall of a bimetallic composite pipe in an embodiment of the present disclosure.

As shown in FIG. 1, this embodiment provides a CMT automatic overlaying method for openings in the side wall of bimetallic composite pipe. The main steps of this method include:

S1. Establishing a mathematical model of the opening in the side wall of the composite pipe to be welded, and keeping the axis of the opening in the side wall of the composite pipe parallel to the horizontal plane when establishing the model;

S2. Based on the mathematical model, illustrating the projection pattern of the opening in the side wall of the composite pipe, and comparing the degree of curvature of the saddle line on the inner wall of the composite pipe and the saddle line on the outer wall of the composite pipe to determine the trajectory of the saddle line during overlaying based on the projection pattern;

S3. Dividing the trajectory of the saddle line into several welding runs, and planning the overlaying sequence of the welding runs by using downslope welding process;

S4. Establishing a CMT overlaying system simulation model based on an industrial robot simulation software.

The steps to establish the simulation model are generally as follows: Pro/E software is adopted to establish a three-dimensional model of the bimetallic composite pipe with holes in the side wall. After saving the model in IGS format, the model is imported into the WeldPRO module of the industrial robot simulation software ROBOGUIDE and placed in a way of placing the mathematical model of the opening in the side wall of the composite pipe to be welded in step 1; then a CMT overlaying system is established in this module, and the CMT overlaying system includes a robot, a welding gun, a workpiece and corresponding fixtures.

The tool coordinate system TCP of the actual arc welding robot is calibrated with the 6-point method. The posture and number of the tool coordinate system TCP in the simulation software are set to be consistent with the actual overlaying, and the relative positions of each component in the simulation model are adjusted to be consistent with the actual overlaying site; and the calibration error is within 2 mm, that is, the movement distance of the welding wire tip when rotating around each axis of the TCP is less than 2 mm.

S5. Based on the overlaying sequence, planning the overlaying path of the simulation model, and generating an overlaying offline instruction based on the overlaying path;

S501. Obtaining the pipe intersecting characteristic curve after the side wall of the composite pipe is opened based on the three-dimensional model;

S502. Extracting the downslope welding path trajectory characteristics of each section of welding runs from the characteristic curve, and setting the welding gun posture information corresponding to each section of welding runs in the CMT overlaying system model based on the path trajectory characteristics;

S503. Generating the offline instruction based on the welding gun posture information;

S6. Based on the offline instructions, perform CMT overlaying on the opening in the side wall of the composite pipe to be welded according to the overlaying sequence to obtain the weld overlay.

Figure 2:
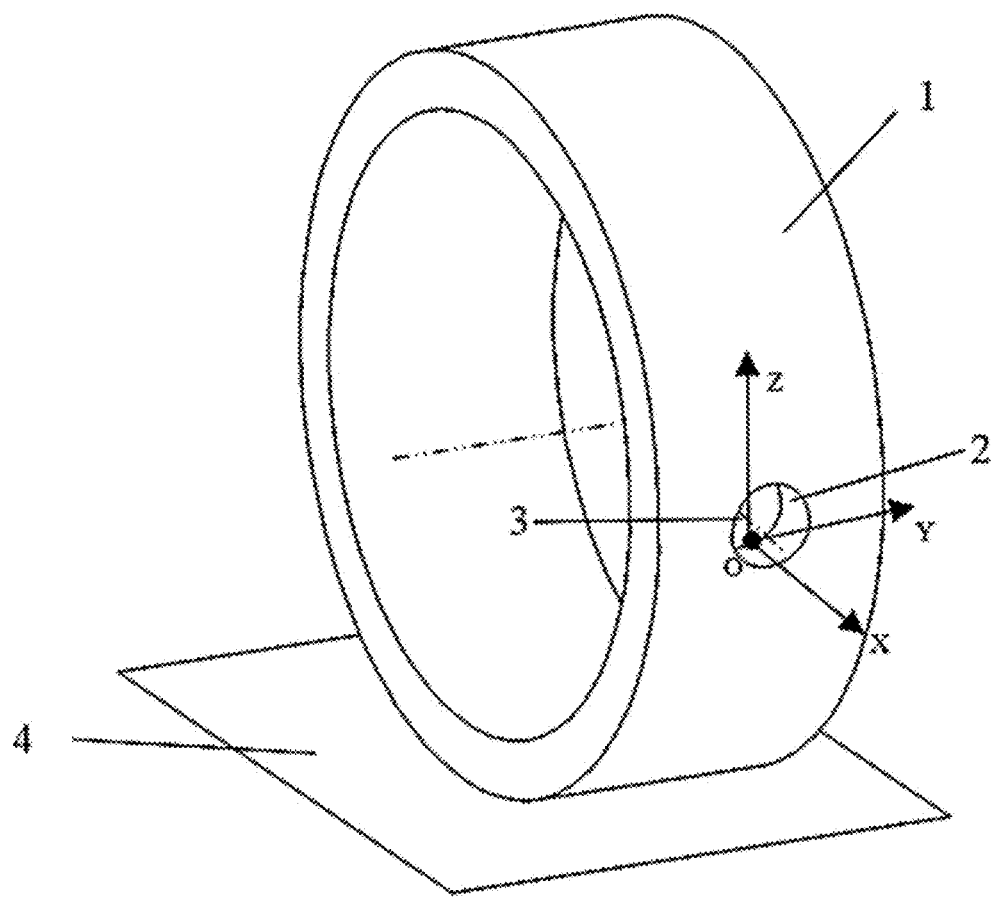
FIG. 2 is a schematic diagram of the opening and placement of the side wall of the composite pipe in an embodiment of the present disclosure.

In step S1, the axis of the opening on the side wall of the composite pipe is kept parallel to the horizontal plane, and a coordinate system is established with point O as the origin, as shown in FIG. 2. The radius of the inner wall of the composite pipe is $R_1$, the radius of the outer wall is $R_2$, the radius at any point in the wall thickness direction is $R_t$, and the radius of the opening in the side wall is r. Within this coordinate system, the curve equation expression of the saddle line weld at any $R_t$ in the wall thickness direction is:

$$\begin{cases} y^2 + (x + R_1)^2 = R_t^2 \\ y^2 + (r - z)^2 = r^2 \end{cases} \quad (1)$$

The parametric equation of expression (1) is:

$$\begin{cases} x = \sqrt{R_t^2 - r^2 \sin^2 t} - R_1 \\ y = r\sin t \\ z = r - r\cos t \end{cases} \quad (2)$$

In the formula, x, y, and z are related parameters, r is the radius of the opening in the side wall, $R_1$ is the radius of the inner wall of the composite pipe, $R_t$ is the radius at any point in the wall thickness direction, and $R_t \in (R_1, R_2)$, and $R_2$ is a radius of the outer wall of the composite pipe, $t \in [0, 2\pi]$.

It can be seen from the expression (1) that the shape of the saddle line is always changing in the wall thickness direction.

Figure 3:
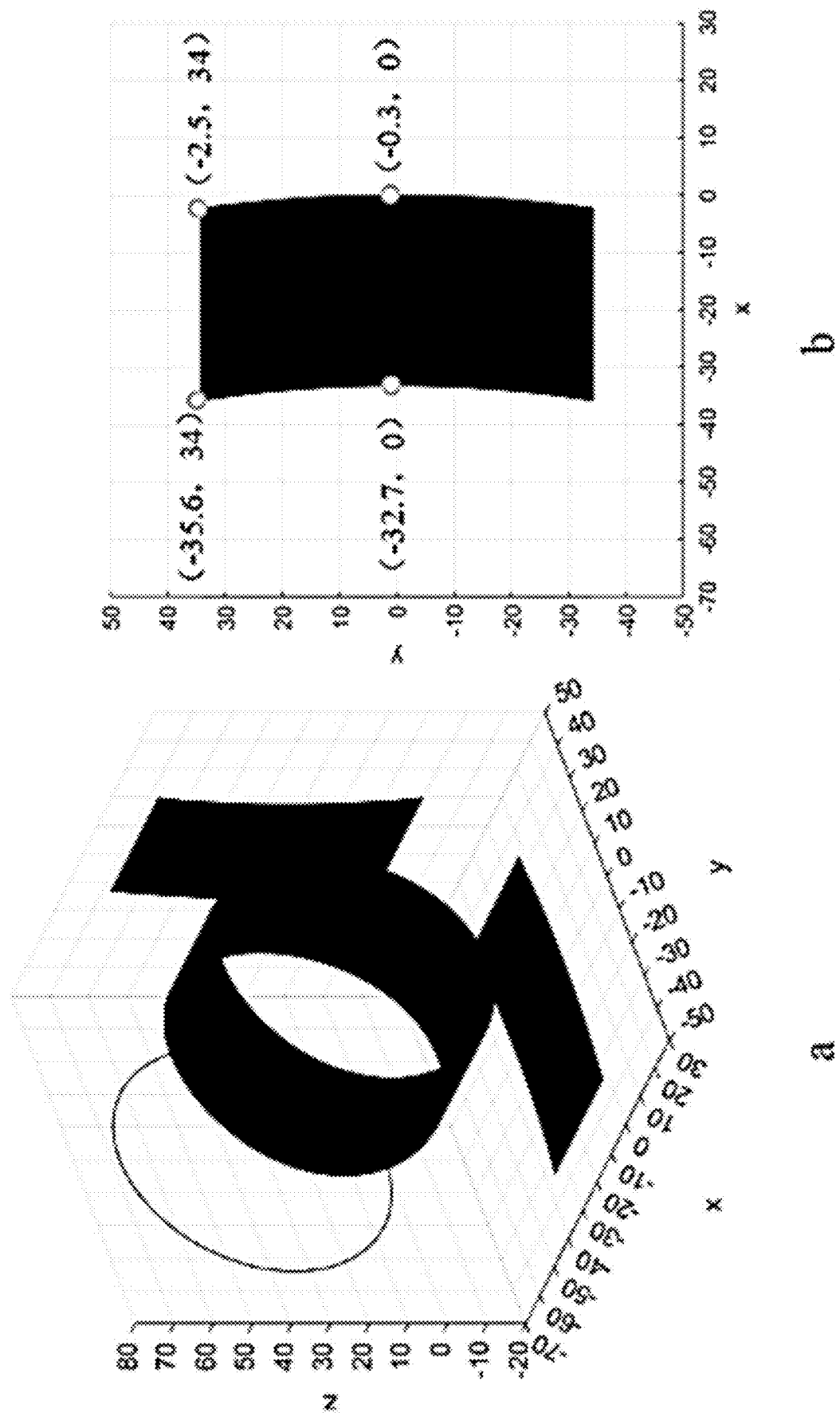
FIG. 3 is a schematic projection view of the opening in the side wall of the composite pipe in an embodiment of the present disclosure.

In step S2, as shown in FIG. 3, Matlab software is adopted to draw the projection pattern of the side wall of the composite pipe after opening according to equation (2), and the degrees of curvatures of the saddle line of the inner wall and the outer wall are compared.

If the difference between the degree of curvature $L_1$ of the saddle line on the opening in the inner wall of the composite pipe to be welded and the degree of curvature $L_2$ of the saddle line on the opening in the outer wall is less than the preset value, the trajectory of the saddle line on the opening in the outer wall of the composite pipe is used as the trajectories of all saddle lines on the openings in the side wall of the composite pipe during overlaying.

If the difference between the degree of curvature $L_1$ of the saddle line on the opening in the inner wall of the composite pipe and the degree of curvature $L_2$ of the saddle line on the opening in the outer wall of the composite pipe is not less than the preset value, then the trajectory of the saddle line at the middle position of the opening in the side wall of the composite pipe is replaced with the trajectory of the saddle line on the opening in the outer wall of the composite pipe during overlaying. The preset value is 1 mm to 2 mm.

In step S3, the overlaying sequence of the welding runs is as follows: dividing the trajectory of saddle line on the opening into an upper half and a lower half with its horizontal midline as a boundary, and the lower half of the welding runs is below the horizontal center line. When welding, all the welding runs on the lower half are welded sequentially by downslope welding, then the opening in the side wall of the composite pipe is turned 180° around the axis, and then all the welding runs on the lower half are welded sequentially by downslope welding until all the welding runs are welded. Preferably, there are 4 sections of welding runs after division; the lengths of the 4 sections of welding runs are the same.

In step S3, each welding run is divided into at least 4 segments, and each segment of the welding runs is set to have a different welding speed; the welding speed of each segment of welding runs is between 45 cm/min and 55 cm/min. The lengths of various welding runs may be the same or different.

The welding gun posture information includes the welding gun camber angle, the welding gun forward tilt angle, the robot joint configuration information, and the position and speed of the trajectory approach point and exit point. The camber angle $\theta_1$ is within the range of 0° to 45°; and the forward tilt angle $\theta_2$ is within the range of 5° to 10°.

In step S6, the process parameters of the CMT overlaying are set as follows: the wire feeding speed is within 6.0 m/min to 8.0 m/min, the current is 159 A to 205 A, the voltage is 11.9 to 15.2V, the dry elongation of the welding wire is 12 mm to 15 mm, and the gas flow rate is 25 L/min to 30 L/min; the protective gas in the CMT overlaying process in the embodiment is pure argon.

In step S6, before performing CMT overlaying according to the overlaying sequence, the exposed surface of the opening in the side wall of the composite pipe to be welded should be cleaned and polished: grinding and cleaning include using a straight grinder to remove sundries and rust from the inner wall surface of the opening, and then alcohol or acetone is adopted to remove the stains on the surface of the polished inner wall. After the lower part is welded, a straight grinder is adopted to grind the head of the weld overlay, and then the composite pipe is rotated to perform CMT overlaying on the upper part of the welding runs.

In step S6, the CMT overlaying is single-run overlaying; when welding, according to the depth of the opening in the side wall of the composite pipe to be welded, multi-run CMT overlaying is carried out from the inner wall of the composite pipe to the outer wall thereof until all side walls with the opening to be welded are all welded; when performing CMT overlaying, the spacing between adjacent welding runs is 3 mm to 4 mm.

Embodiment 2

This embodiment provides a CMT automatic overlaying method for opening holes in the side wall of a bimetallic composite pipe. The main steps of the method include:

S1. Establishing a mathematical model for the opening of the side wall of the composite pipe: In order to intuitively and clearly express the projected shape of each surface after the opening of the side wall of the composite pipe, and to facilitate subsequent analysis, a mathematical model should be established. When establishing the mathematical model, as shown in FIG. 2, the axis of the opening in the side wall of the composite pipe should be kept parallel to the horizontal plane, and a coordinate system should be established with point O as the origin. The radius of the inner wall of the composite pipe is set as $R_1$, the radius of the outer wall is set as $R_2$, the radius at any point in the wall thickness direction is $R_t$, and the radius of the opening in the side wall is r.

Within this coordinate system, the curve equation of the saddle line weld at any $R_t$ in the wall thickness direction is:

$$\begin{cases} y^2 + (x+R_1)^2 = R_t^2 \\ y^2 + (r-z)^2 = r^2 \end{cases}$$

Its parametric equation is:

$$\begin{cases} x = \sqrt{R_t^2 - r^2\sin^2 t} - R_1 \\ y = r\sin t \\ z = r - r\cos t \end{cases} \quad (4)$$

In the formula, $R_t \in (R_1, R_2)$, $t \in \lceil 0, 2\pi \rceil$.

S2. As shown in FIG. 3, it can be seen that the shape of the saddle line is always changing in the wall thickness direction. Based on formula (4), Matlab software is adopted to draw the projection pattern of the side wall of the composite pipe after opening. As shown in FIG. 3, a in the figure is the projection in the three directions of the coordinate system, b in the figure is the projection on the plane in the x direction or the plane in the y direction, and comparison is made between the curvature of the saddle line of the inner wall (left line in the projection) and outer wall (right line in the projection) through the projection in b.

Suppose the degree of curvature of the saddle line on the inner wall of the composite pipe is $L_1$, and the degree of curvature of the saddle line on the outer wall is $L_2$. Taking the difference $L=L_1-L_2$ as the standard, when L is less than 1.5 mm, their degrees of curvatures are close. Under the circumstances, the trajectory of saddle line on the outer wall may be used to replace the trajectory of all the saddle line along the wall thickness direction during overlaying. If L is not less than 1.5 mm, their degrees of curvatures are not close, then it is necessary to replace the trajectory of saddle line of the outer wall with the trajectory of saddle line of the inner wall at the middle position in the wall thickness direction.

Figure 4:
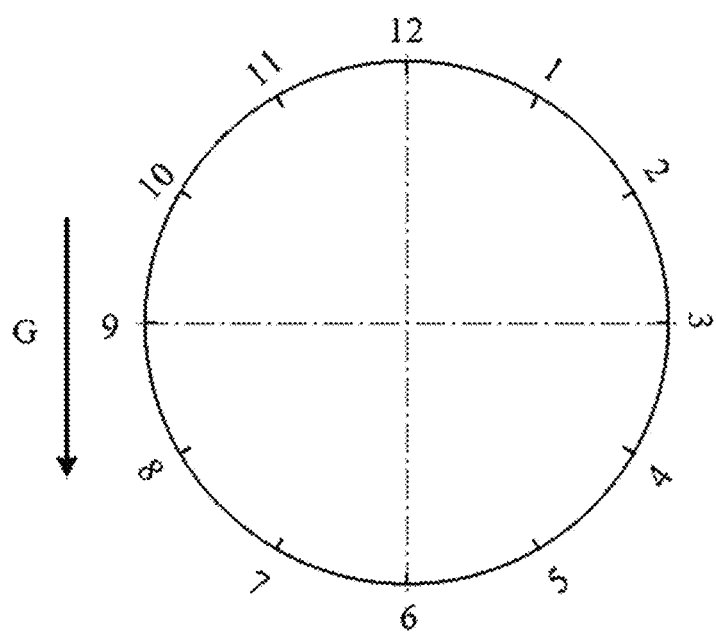
FIG. 4 is a schematic diagram of zoning saddle line in an embodiment of the present disclosure.

S3. Dividing the trajectory of the saddle line into several welding runs by adopting the downslope welding process, and planning the overlaying sequence of the welding runs;

In order to easily express the position of different points on the saddle line, the whole circle of trajectory of the saddle line is divided into 12-o'clock directions, as shown in FIG. 4.

Figure 5:
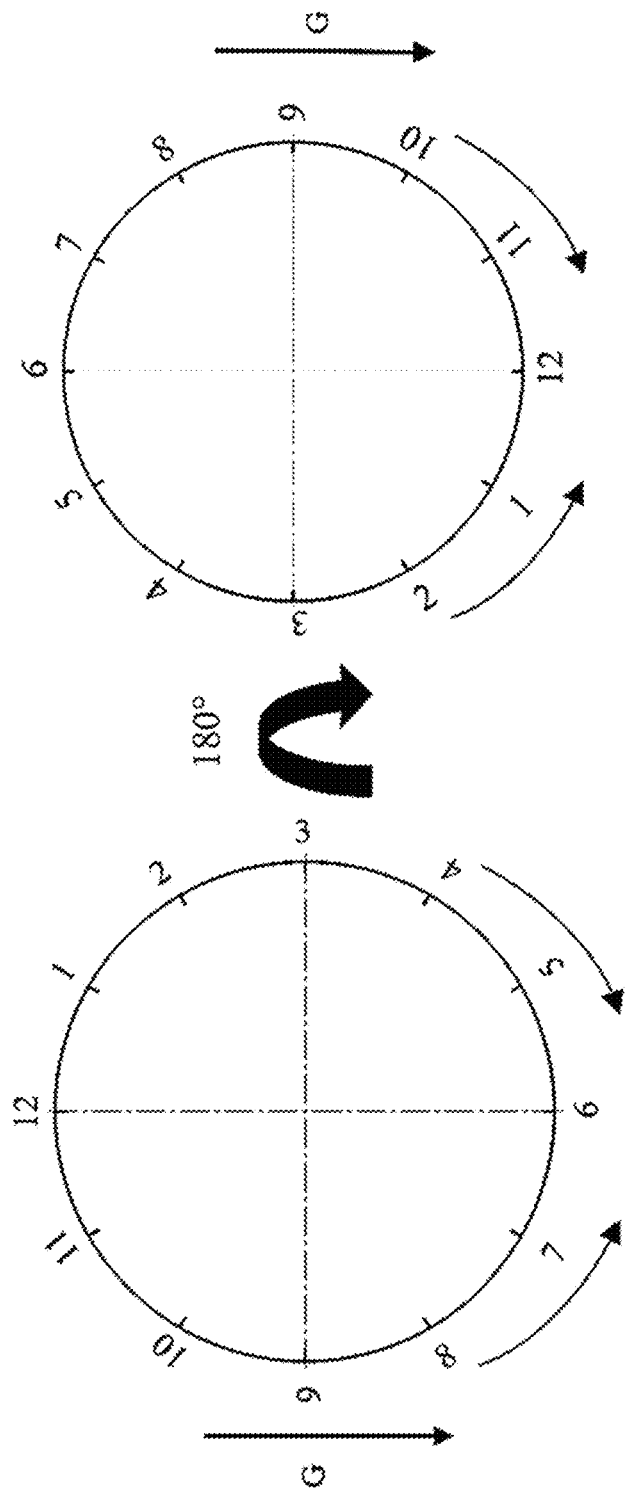
FIG. 5 is a schematic diagram of planning the overlaying sequence in an embodiment of the present disclosure.

The downslope welding method is adopted for all overlaying, and the specific planning sequence of the 4 sections of welding runs is shown in FIG. 5.

Figure 8:
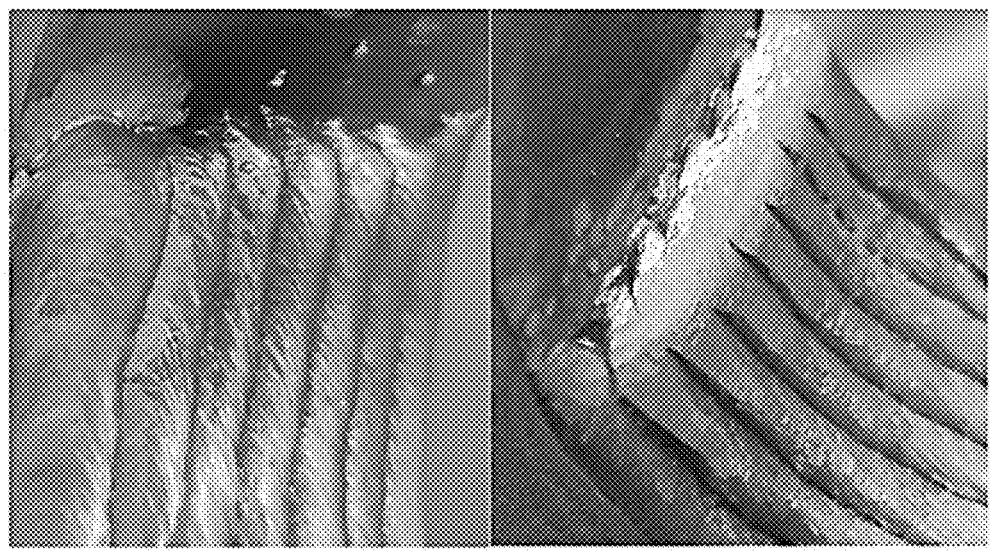
FIG. 8 is a schematic diagram of the head of the welding layer before and after grinding in an embodiment of the present disclosure.

1) Overlaying is performed on welding run 1 first: The downslope welding is performed from the 9 o'clock direction of the saddle line to the 6 o'clock direction until the whole area is completely welded in the wall thickness direction.
2) Overlaying is performed on welding run 2: The downslope welding is performed from the 3 o'clock direction of the saddle line to the 6 o'clock direction until the whole area is completely welded in the wall thickness direction.
3) The main pipe of the composite pipe is turned over by 180°, and the welding head positions of the completed welding run 1 and welding run 2 are polished, as shown in FIG. 8. a is the welding head before polishing, and b is the welding head after polishing, so it is possible to prevent unfusion defects at the weld joints of adjacent welding runs during subsequent welding.
4) Overlaying is performed on welding run 3: The downslope welding is performed from the 3 o'clock direction of the saddle line to the 12 o'clock direction until the whole area is completely welded in the wall thickness direction.
5) Overlaying is performed on welding run 4: The downslope welding is performed from the 9 o'clock direction of the saddle line to the 12 o'clock direction until the whole area is completely welded in the wall thickness direction.

Figure 6:
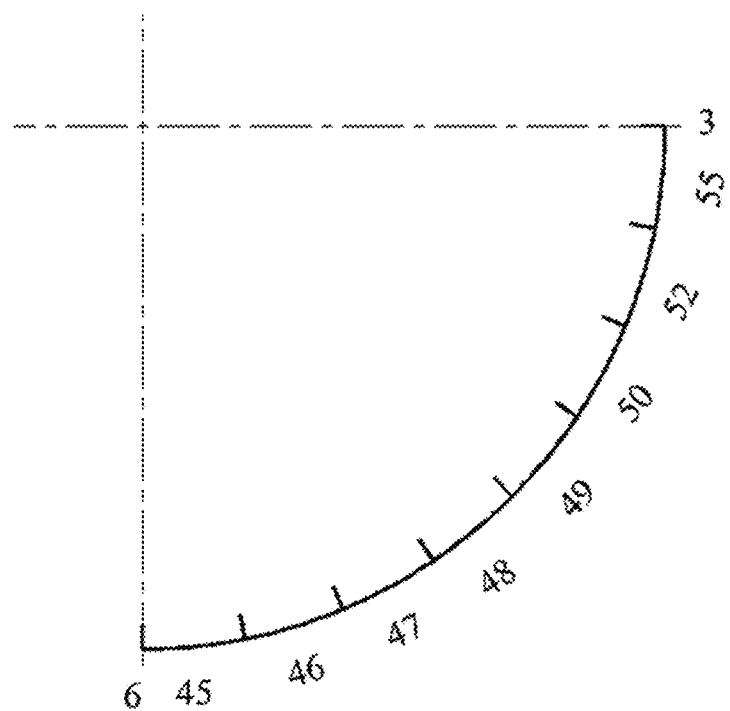
FIG. 6 is a schematic diagram of a welding speed of each section of welding runs in the direction of 3 o'clock to 6 o'clock in an embodiment of the present disclosure.

This method divides a circle of saddle line into four sections, and the overlaying process of each section is consistent, which is different from ordinary plate downslope welding. In the process of downslope welding along the arc in the direction from 3 o'clock to 6 o'clock as shown in FIG. 6, the influence of gravity on the molten pool is getting smaller and smaller, that is, the driving force for downward flow is getting smaller and smaller, making the welding layer to be formed stably.

In order to obtain a well-formed weld overlay, each section of overlaying trajectory is further divided into n small segments, and different welding speeds are set for each segment to ensure that the molten pool flows downward evenly; taking the direction from 3 o'clock to 6 o'clock as an example, this section of overlaying trajectory is divided into 6 small segments, and the welding speed of each small segment is 45 cm/min, 47 cm/min, 49 cm/min, 51 cm/min, 53 cm/min and 55 cm/min respectively.

S4. Establishing a simulation model of the CMT overlaying system based on ROBOGUIDE: Pro/E software is adopted to establish a three-dimensional model of the bimetallic composite pipe with holes in the side wall. After saving the model in IGS format, the model is imported into the WeldPRO module of ROBOGUIDE, and the three-dimensional model is placed in a way like the pipe arrangement in step 1 (that is, the hole axis is parallel to the horizontal plane, etc.);

Then a CMT overlaying system simulation model is established in this module, and the overlaying system simulation model includes a robot, a welding gun, a workpiece and corresponding fixtures.

The tool coordinate system TCP of the actual arc welding robot is calibrated with the 6-point method. The posture and number of the tool coordinate system TCP of the simulation model in the simulation software are set to be consistent with the actual overlaying performed by welding robot, and the relative positions of each component in the simulation model are adjusted to be consistent with the actual overlaying site; and the calibration error of the tool coordinate system TCP of the actual arc welding robot under the 6-point method is controlled within 2 mm, that is, when the tip of the welding wire rotates around each axis of the TCP, the moving distance is less than 2 mm. The actual arc welding robot model used in this example is FANUC Robot M-10iA, and the welding gun model is FRONIUS RA 280 36G.

Figure 7:
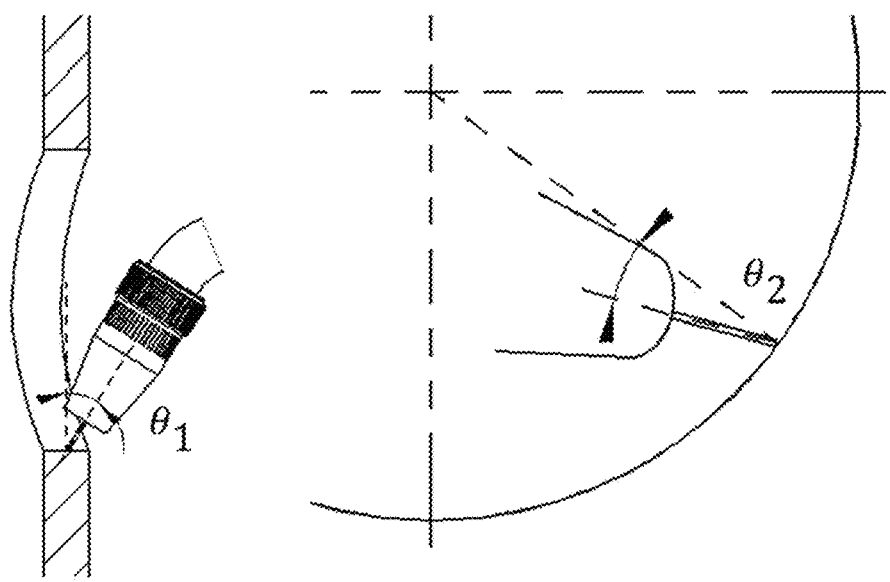
FIG. 7 is a schematic diagram of a camber angle $\theta_1$ and a forward tilt angle $\theta_2$ of the welding gun in an embodiment of the present disclosure.

S5. Based on the overlaying sequence, planning the overlaying path in the simulation model, and generating an overlaying offline instruction based on the overlaying path;

S501. Obtaining the pipe intersecting characteristic curve after the side wall of the composite pipe is opened based on the three-dimensional model;

S502. Extracting the downslope welding path trajectory characteristics of each section of welding runs from the characteristic curve, and setting the welding gun posture information corresponding to each section of welding runs in the CMT overlaying system model based on the path trajectory characteristics, including the welding gun camber angle, the welding gun forward tilt angle, the robot joint configuration information, and the position and speed of the trajectory approach point and exit point. Specifically, the camber angle $\theta_1$ and forward tilt angle $\theta_2$ are shown in FIG. 7.

S503. Generating the offline instruction based on the welding gun posture information;

S6. Based on the offline instruction, performing CMT overlaying on the opening in the side wall of the composite pipe to be welded according to the overlaying sequence, so as to obtain a weld overlay;

The process parameters of the CMT overlaying are set as follows: the wire feeding speed is within 7 m/min, the current is 180 A, the voltage is 15.2V, the dry elongation of the welding wire is 13 mm, and the gas flow rate is 28 L/min; the protective gas in the CMT overlaying process in the embodiment is pure argon.

Before performing CMT overlaying according to the overlaying sequence, the exposed surface of the opening in the side wall of the composite pipe to be welded has to be processed by using a straight grinder to remove surface debris and rust, and then alcohol is adopted to remove the stains on the surface of the polished inner wall.

The CMT overlaying is single-run welding; when welding, according to the depth of the opening in the side wall of the composite pipe to be welded, multi-run CMT overlaying is carried out from the inner wall of the composite pipe to the outer wall thereof until all side walls with the opening to be welded are all welded; the spacing between adjacent welding runs is 3 mm.

Embodiment 3

This embodiment provides a CMT automatic overlaying method for openings in the side wall of bimetallic composite pipe. The FANUC M-10iA six-degree-of-freedom arc welding robot is adopted to conduct the overlaying test. The end-fixed welding gun model is FRONIUS RA 280 36G; the radius $R_1$ of the inner wall of the bimetal composite pipe adopted is 225 mm, the radius of the outer wall $R_2$ is 258 mm, and the radius of the opening in the side wall is 34 mm.

As shown in FIG. 1, FIG. 1 shows a CMT automatic overlaying technology for a bimetallic composite pipe with holes on the side wall. The implementation steps are as follows:

S1. The bimetal composite pipe is arranged as shown in FIG. 2 and a coordinate system is established, and Matlab is adopted to draw the cross-section of openings in the side wall of the composite pipe as well as the projection thereof on various planes according to equation (2). As shown in a in FIG. 3; in order to compare the curvature of the saddle line of the inner wall and outer wall of the composite pipe, two points are taken from the saddle line of the inner wall and outer wall, as shown in b in FIG. 3.

Then the degree of curvature of the saddle line on the inner wall is:

$$-35.6-(-32.7)=-2.9 \text{ mm} \quad (5)$$

The degree of curvature of the saddle line of the outer wall is:

$$-2.5-(-0.30)=-2.2 \text{ mm} \quad (6)$$

That is, the difference between the degree of curvature of the inner wall of the composite pipe and the saddle line of the outer wall is only 0.7 mm. Therefore, the trajectory of the saddle line of the outer wall at the opening of the main pipe may be used to replace all the trajectories of the saddle line during the overlaying process.

S2. The sequence of welding runs is planned as shown in FIG. 4. The line between 9 o'clock and 3 o'clock is taken as the boundary, the trajectory of the saddle line is divided into the upper half and the lower half. The welding runs in the lower half are all located below the boundary line. The trajectories of welding runs from 9 o'clock to 6 o'clock and from 3 o'clock to 6 o'clock sections shown in FIG. 5 are divided into 8 small segments. The welding speed of each small segment is shown in FIG. 6. Welding is completed in sequence. After welding, as shown in FIG. 5, the opening on the composite pipe is rotated by 180° so that the upper half of the welding runs is below the boundary line, and then the same downslope welding method as used before is adopted to weld all of the upper half of the welding runs which are rotated to a position below the boundary line.

S3. Pro/E is adopted to establish a mathematical model of the bimetal composite pipe side wall with opening, the model is imported it into the WeldPRO module of ROBOGUIDE, and the layout of the simulation system is completed. The tool coordinate system of the actual arc welding robot is calibrated with the 6-point method, and the tip of the welding wire rotates around each axis of the TCP to check whether the accuracy of the TCP is controlled within 2 mm. If the accuracy is greater than 2 mm, recalibration is required until the error is less than 2 mm. The posture and number of the tool coordinate system TCP are set in the ROBOGUIDE simulation system to be consistent with the actual one, and the relative position of each component is adjusted to be consistent with the actual overlaying site.

S4. The Draw Part Features function of WeldPRO is adopted to identify the pipe intersecting characteristic curve after the side wall is opened, the sections of trajectories from 9 o'clock to 6 o'clock and from 3 o'clock to 6 o'clock in step S1 are extracted respectively to and generate the overlaying trajectory characteristics. The trajectory segmentation function in Pos Defaults is adopted to divide the two trajectories into 8 small segments as described in step 2.

The extracted feature information of the two sections of trajectories and the welding gun posture information, including the welding gun camber angle $\theta_1$ of 38°, the welding gun forward tilt angle $\theta_2$ of 5°, the robot joint configuration (FUT), and the position and speed of the trajectory approach point and exit point.

After setting, the offline instruction of the robot in WeldPRO is generated, and the welding speed of each section of small trajectory in the process is modified as shown in FIG. 6, and the process is saved in TP format and imported into the control cabinet of the actual robot.

S5. The process parameters are set and the CMT overlaying test is carried out. Before welding, the exposed surface of the composite pipe with opening is polished and cleaned to remove rust and stains on the surface. The welding speed is shown in FIG. 6, and the information is stored in the offline instruction.

The following process parameters are set on the CMT 4000 Advanced welding machine: wire feeding speed is 6.0 m/min, current is 159 A, voltage is 11.9V, dry elongation of welding wire is 13 mm, protective gas is pure argon, gas flow is 25 L/min. After setting, offline instructions imported in step S4 are used to perform overlaying according to the welding run sequence planned in FIG. 5.

The welding wire adopted in the test is ERNiCrMo-3 with a diameter of 1.14 mm.

Figure 9:
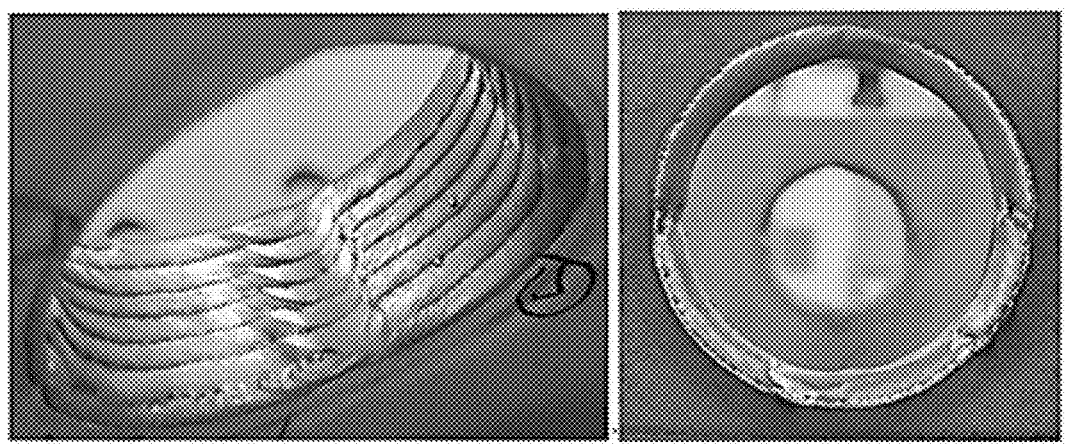
FIG. 9 is an Inconel 625 alloy welding layer obtained by the CMT method in an embodiment of the present disclosure.

The wall thickness of the composite pipe adopted in the test is 33 mm, and the path spacing is selected to be 4 mm. The overlaying starts from a side close to the inner wall, and each section of trajectory is welded with 8 paths. After the welding run 1 and the welding run 2 are welded, as shown in FIG. 8, the polishing head of the welding runs is polished, and there are a total of 32 welding runs. As shown in FIG. 9, the weld overlay is well formed and has a uniform thickness.

S6. Three 20 mm×25 mm×1 mm samples are taken from the weld overlay and they are soaked in 6% $FeCl_3$ solution at 50° C. for 24 hours to evaluate the pitting corrosion resistance of the weld overlay. The test results are shown in Table 1:

TABLE 1

Pitting corrosion weight loss test results of weld overlay

| Sample No. | Weight before test (g) | Weight after test (g) | Weight loss rate (g/m$^2$) | Average weight loss rate (g/m$^2$) |
|---|---|---|---|---|
| 01 | 3.531 | 3.531 | 0 | |
| 02 | 4.718 | 4.715 | 2.713 | 1.202 |
| 03 | 4.038 | 4.037 | 0.893 | |

Three 20 mm×20 mm×1 mm samples are taken from the weld overlay and soaked in a slightly boiling 50% $FeSO_4$-sulfuric acid solution for 120 hours to evaluate the intergranular corrosion resistance of the weld overlay. The test results are shown in Table 2:

TABLE 2

Heaping weld overlay intergranular corrosion weight loss test results

| Sample No. | Weight before test (g) | Weight after test (g) | Corrosion rate (mm/y) | Average corrosion rate (mm/y) |
|---|---|---|---|---|
| 01 | 3.353 | 3.261 | 0.881 | |
| 02 | 3.430 | 3.385 | 0.435 | 0.565 |
| 03 | 3.363 | 3.324 | 0.377 | |

In summary, the pitting weight loss rate of the CMT weld overlay is 1.202 g/m$^2$, which is far less than the acceptance standard value of 4.0 g/m$^2$ for the pitting weight loss test; the corrosion rate of the intergranular corrosion weight loss test of the CMT weld overlay is 0.565 g/m$^2$, which is far less than the acceptance standard value of 1.0 mm/y in the intergranular corrosion weight loss test.

Therefore, the CMT weld overlay obtained by using this technology for testing is not only excellent in forming, but also excellent in corrosion resistance.

The present disclosure uses cold metal transfer (CMT) welding technology to weld Inconel 625 alloy to the opening in the side wall of the bimetallic composite pipe on the basis of joint planning of robot welding torch pose, motion trajectory and process parameters.

The disclosure has the following advantageous effects:
(1) Automatic overlaying of complex curves is realized. The overlaying on the opening in the side wall of the composite pipe is different from that of the flat plate. The spatial position and shape thereof are complex, and high requirements are imposed on the robot trajectory and the posture of the welding gun. This disclosure realizes automatic overlaying of robots through offline programming based on ROBOGUIDE. Compared with manual arc welding, the molding quality is more stable and less susceptible to interference from external factors.
(2) High overlaying efficiency and trajectory accuracy. The off-line programming method not only gets rid of the cumbersome robot manual teaching, but also improves the efficiency of overlaying, and the accuracy of trajectory of the robot overlaying is much higher than that of manual teaching, which is crucial for obtaining a well-formed weld overlay.
(3) The weld overlay is well formed and has stable quality. The saddle line is divided into four sections by downslope welding, and then each section is divided into n segments, and each segment is welded with changing welding parameters, which solves the problem of poor forming due to the constant change of gravity components during downslope welding problem, and the obtained weld overlay is not only excellent in shape but also stable in quality.
(4) The dilution rate of the weld overlay is low, and the corrosion resistance is excellent. The CMT welding method avoids the generation of short circuit and large current during the droplet transfer process by drawing back the welding wire, which greatly reduces the heat input, and inhibits the diffusion of Fe elements in the X65 base material to the weld overlay. Pitting corrosion and intergranular corrosion test results are far below the acceptance criteria.

The above descriptions are only preferred embodiments of the present disclosure and are not intended to limit the present disclosure. Any modifications, equivalent substitutions and improvements made within the spirit and principles of the present disclosure shall be included in the protection scope of the present disclosure.

What is claimed is:
1. A cold metal transfer (CMT) automatic overlaying method for opening holes in a side wall of a bimetallic composite pipe, comprising:
S1. establishing a mathematical model of an opening in a side wall of a composite pipe to be welded, and keeping an axis of the opening in the side wall of the composite pipe parallel to a horizontal plane; wherein an expression of the mathematical model is a parameter equation of a saddle line weld at any point in a wall thickness direction of the opening in the side wall of the composite pipe:

$$\begin{cases} x = \sqrt{R_t^2 - r^2\sin^2 t} - R_1 \\ y = r\sin t \\ z = r - r\cos t \end{cases}$$

in the mathematical model, r is a radius of the opening in the side wall, $R_1$ is a radius of an inner wall of the composite pipe, $R_t$ is a radius at any point in the wall thickness direction, and $R_t \in (R_1, R_2)$, $R_2$ is a radius of an outer wall of the composite pipe, $t \in [0, 2\pi]$;

S2. based on the mathematical model, illustrating a projection pattern of the opening in the side wall of the composite pipe, and determining a trajectory of a saddle line during overlaying based on the projection pattern:

a degree of curvature of a saddle line on the inner wall of the composite pipe and a saddle line on the outer wall of the composite pipe are compared based on the projection pattern:

if a difference between the degree of curvature $L_1$ of the saddle line on the opening in the inner wall of the composite pipe to be welded and the degree of curvature $L_2$ of the saddle line on the opening in the outer wall is less than a preset value, a trajectory of the saddle line on the opening in the outer wall of the composite pipe is used as trajectories of all saddle lines on the openings in the side wall of the composite pipe during overlaying;

if the difference between the degree of curvature $L_1$ of the saddle line on the opening in the inner wall of the composite pipe to be welded and the degree of curvature $L_2$ of the saddle line on the opening in the outer wall of the composite pipe is not less than the preset value, then a trajectory of a saddle line at the middle position of the opening in the side wall of the composite pipe is replaced with the trajectory of the saddle line on the opening in the outer wall of the composite pipe during overlaying;

S3. dividing the trajectory of the saddle line into several welding runs, all of which adopt a downslope welding process, and planning an overlaying sequence of the welding runs, the overlaying sequence comprising: dividing the trajectory of the saddle line on the opening into an upper half and a lower half with a horizontal midline of the trajectory of the saddle line on the opening as a boundary, and the lower half of the welding runs is below the horizontal midline; when welding, all the welding runs on the lower half are welded sequentially by downslope welding, then the opening in the side wall of the composite pipe is turned 180° around the axis, and then all the welding runs on the lower half are welded sequentially by downslope welding until all the welding runs are welded;

S4. establishing a three-dimensional model of the opening in the side wall of the composite pipe to be welded and a CMT overlaying system simulation model;

S5. based on the overlaying sequence, planning an overlaying path of the CMT overlaying system simulation model to the three-dimensional model, and generating an overlaying offline instruction based on the overlaying path, specific steps comprising:

S501. obtaining a pipe intersecting characteristic curve after the side wall of the composite pipe is opened based on the three-dimensional model;

S502. extracting downslope welding path trajectory characteristics of each section of the welding runs from the pipe intersecting characteristic curve, and setting welding gun posture information corresponding to each section of the welding runs in the CMT overlaying system simulation model based on the downslope welding path trajectory characteristics;

S503. generating the overlaying offline instruction based on the welding gun posture information;

S6. based on the overlaying offline instruction, performing CMT overlaying on the opening in the side wall of the composite pipe to be welded according to the overlaying sequence, so as to obtain a weld overlay.

2. The CMT automatic overlaying method for the opening holes in the side wall of the bimetallic composite pipe according to claim 1, wherein in step S2, the preset value is 1 mm to 2 mm.

3. The CMT automatic overlaying method for the opening holes in the side wall of the bimetallic composite pipe according to claim 1, wherein in step S3, there are 4 sections of the welding runs.

4. The CMT automatic overlaying method for the opening holes in the side wall of the bimetallic composite pipe according to claim 3, wherein lengths of the 4 sections of welding runs are the same.

5. The CMT automatic overlaying method for the opening holes in the side wall of the bimetallic composite pipe according to claim 1, wherein in step S3, each of the welding runs is divided into at least 4 segments.

6. The CMT automatic overlaying method for the opening holes in the side wall of the bimetallic composite pipe according to claim 5, wherein each segment of the welding runs is set to have a different welding speed.

7. The CMT automatic overlaying method for the opening holes in the side wall of the bimetallic composite pipe according to claim 6, wherein the welding speed is between 45 cm/min and 55 cm/min.

8. The CMT automatic overlaying method for the opening holes in the side wall of the bimetallic composite pipe according to claim 6, wherein lengths of various segments of the welding runs are the same or different.

9. The CMT automatic overlaying method for the opening holes in the side wall of the bimetallic composite pipe according to claim 1, wherein the welding gun posture information comprises a welding gun camber angle, a welding gun forward tilt angle, robot joint configuration information, and a position and a speed of a trajectory approach point and an exit point.

10. The CMT automatic overlaying method for the opening holes in the side wall of the bimetallic composite pipe according to claim 9, wherein the welding gun camber angle is within a range of 0° to 45°.

11. The CMT automatic overlaying method for the opening holes in the side wall of the bimetallic composite pipe according to claim 10, wherein the welding gun forward tilt angle is within a range of 5° to 10°.

12. The CMT automatic overlaying method for the opening holes in the side wall of the bimetallic composite pipe according to claim 1, wherein in step S6, the process parameters of the CMT overlaying comprise: a wire feeding speed is within 6.0 m/min to 8.0 m/min, a current is 159 A to 205 A, a voltage is 11.9 to 15.2V, a dry elongation of a welding wire is 12 mm to 15 mm, and a gas flow rate is 25 L/min to 30 L/min.

13. The CMT automatic overlaying method for the opening holes in the side wall of the bimetallic composite pipe according to claim 12, wherein a protective gas in the CMT overlaying process is pure argon.

14. The CMT automatic overlaying method for the opening holes in the side wall of the bimetallic composite pipe according to claim 13, wherein before performing the CMT overlaying according to the overlaying sequence, an exposed surface of the opening in the side wall of the composite pipe to be welded is cleaned and polished first.

15. The CMT automatic overlaying method for the opening holes in the side wall of the bimetallic composite pipe according to claim 1, wherein the CMT overlaying is single-run overlaying.

16. The CMT automatic overlaying method for the opening holes in the side wall of the bimetallic composite pipe according to claim 15, wherein when overlaying, according to a depth of the opening in the side wall of the composite pipe to be welded, multi-run CMT overlaying is carried out from the inner wall of the composite pipe to the outer wall thereof until all side walls with the opening to be welded are all welded.

17. The CMT automatic overlaying method for the opening holes in the side wall of the bimetallic composite pipe according to claim 16, wherein when performing the CMT overlaying, a spacing between adjacent welding runs is 3 mm to 4 mm.

* * * * *